Figure 2:
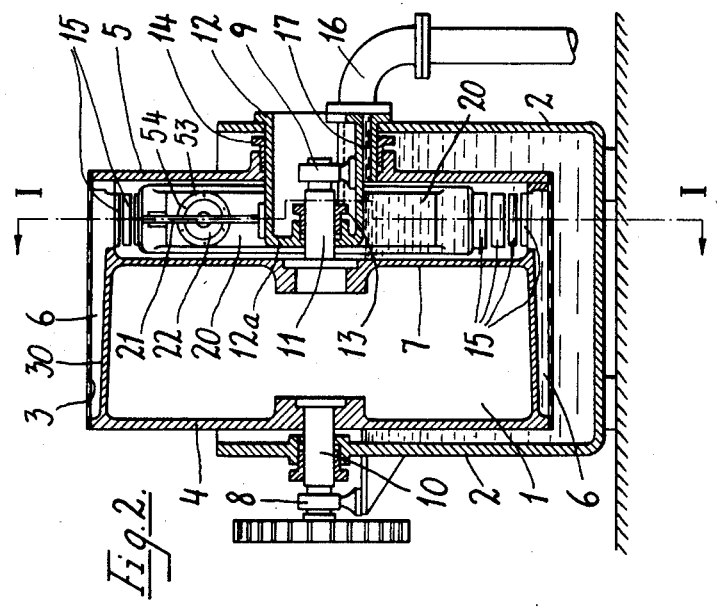

Dec. 19, 1950  J. V. VITALIUS ET AL  2,534,563
FILTER DRUM AND SHIELDING SHOE
Filed Feb. 14, 1948  2 Sheets-Sheet 1

Inventors:
Josef Vitalis Vitalius
Nils Klykken
by W. Bayard Jones
Attorney.

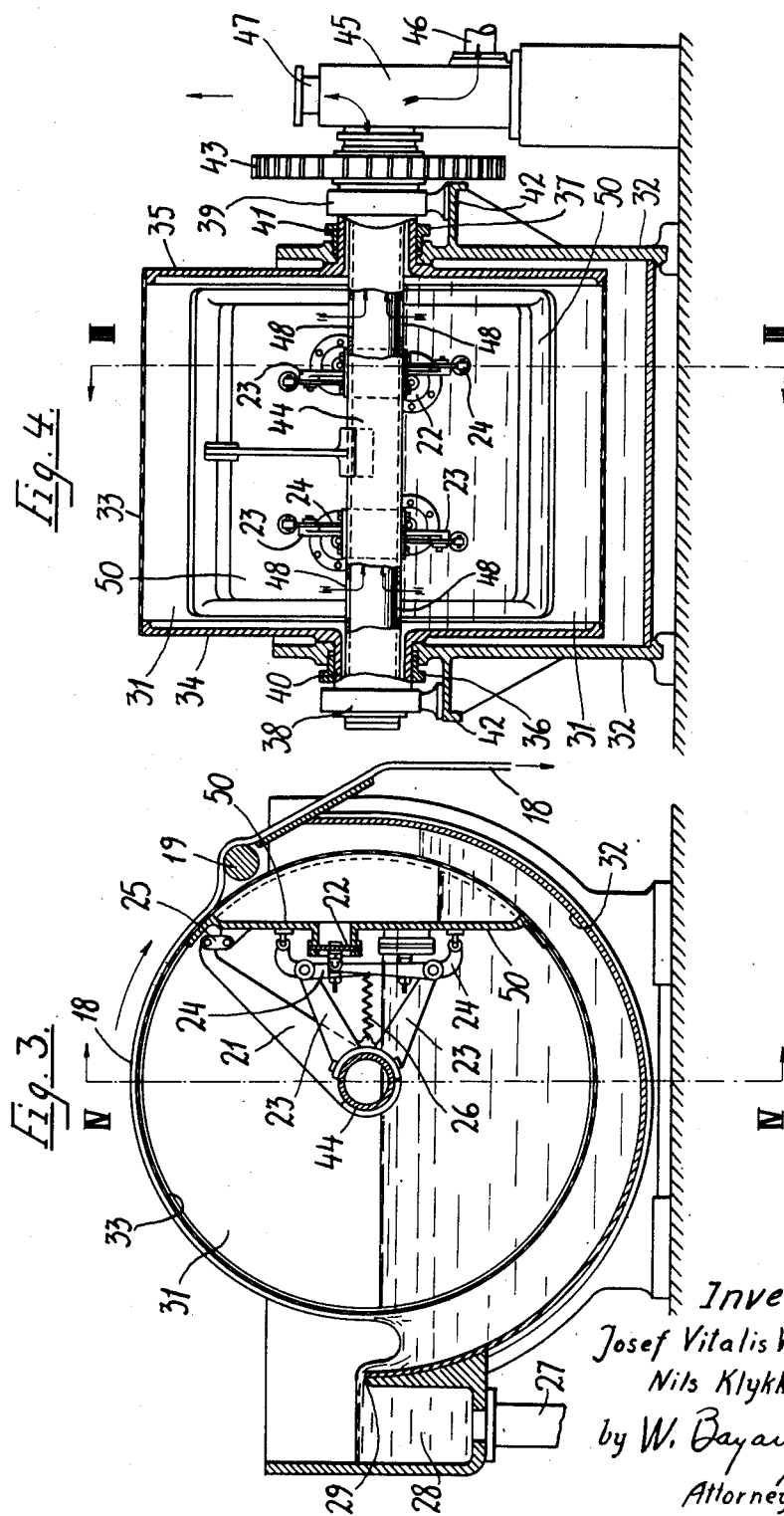

Patented Dec. 19, 1950

2,534,563

UNITED STATES PATENT OFFICE 2,534,563

FILTER DRUM AND SHIELDING SHOE

Josef Vitalis Vitalius, Karlstad, Sweden, and Nils Klykken, Hudson Falls, N. Y., assignors to Aktiebolaget Kamyr, Karlstad, Sweden, a company of Sweden Application February 14, 1948, Serial No. 8,398
In Sweden November 18, 1946

Section 1, Public Law 690, August 8, 1946
Patent expires November 18, 1966

4 Claims. (Cl. 210—202)

The present invention relates to an improvement in filters of the kind which are used for extracting fibers or the like in the form of a web of fiber material from a fiber pulp mixture, and which comprise a rotary sieve drum which is provided with a perforated sieve shell and the interior of which forms a chamber in which a lower pressure is maintained than the pressure outside the sieve drum, and in which chamber there is provided a stationary shield or baffle plate which is adjustable towards and away from the sieve shell and which serves to shield off a portion of the inner surface of the sieve shell at that zone of the sieve shell where the web of material is removed from the outer face of the sieve drum. Such filters usually operate at atmospheric pressure on the outside of the sieve drum and with suction in the interior of the drum, but there are also filters which operate at a higher pressure than atmospheric pressure on the outside of the drum. Usually, the rotary sieve drum is partially immersed in the pulp mixture in a tank containing said mixture.

In order to render it possible to effect the removal of the web of material from the outer face of the sieve drum, it is necessary that the shield shall bear sufficiently tightly against the inner face of the sieve drum or shell at all conditions of operation. The shield is actuated in the inward direction, that is to say, in the direction away from the sieve drum, by a pressure that is equal to the difference between the pressure outside the drum and the pressure in the interior of the drum. In order to provide a tight seal between the shield and the sieve drum or shell, the shield must be actuated in the outward direction against the sieve drum or shell by a sealing pressure which must be greater than the pressure acting on the shield in the inward direction. Such sealing pressure is produced, as a rule, by means of a spring, or several springs, which must, of course, have such strength that also at the maximum difference that may arise between the outside pressure and the inside pressure, that is to say, at the greatest inward pressure that may prevail upon the shield, the springs will overcome this pressure and exert a sufficient surplus force to effect a tight seal between the shield and the inner face of the sieve drum or shell. This arrangement entails a considerable disadvantage in that when the drum is running idle, that is to say, when there is no difference between outside pressure and inside pressure, or when the filter operates at a comparatively small difference between outside pressure and inside pressure, the filter runs heavily and much wear is caused on the sliding surfaces owing to the fact that the shield is forced against the sieve drum or shell by the full spring pressure, or by the greater portion of said pressure.

It is an object of the present invention to provide a filter in which the above mentioned difficulties inherent in prior constructions are eliminated, and in which the above mentioned pressure difference between the outside and the inside pressures acting upon the shield is utilized to produce a force or pressure which acts upon the shield in the outward direction from the interior of the drum, and which corresponds to and balances the above mentioned pressure or force which acts on the shield in the inward direction and is produced by the pressure difference between the outside and inside pressures. Optionally, the force or pressure acting on the shield in the outward direction may also be utilized to produce the required sealing pressure wholly or partially.

With this purpose in view, an essential feature of the present invention consists in that a pressure actuated element or member which is influenced by the pressure difference between the pressures prevailing outside the sieve drum and in the interior thereof, is connected with the shield through a pressure transmitting device of such construction that the pressure or force exerted by the said pressure difference on said pressure actuated member is transformed into a pressure or force acting upon the shield from the interior of the drum in the outward direction, said pressure or force being opposed to the pressure acting upon the shield in the inward direction due to the said pressure difference, and being of such magnitude that the last mentioned pressure acting upon the shield in the inward direction is wholly or partially balanced.

Preferably, the pressure actuated element or member and the pressure transmitting device are arranged in such manner that the pressure or force transmitted from the pressure actuated member and acting in the outward direction on the shield is greater than the pressure acting on the shield in the inward direction due to the pressure difference, whereby the difference between the said pressures on the shield may be utilized for holding the shield against the inner face of the sieve drum with the required bearing and sealing pressure.

The pressure actuated element or member may, of course, be positioned in the sieve drum at any point suitable for the purpose, provided that the said member is influenced by the difference between the outside pressure and the pressure in the interior of the drum. In a particularly suitable construction according to the invention, the pressure actuated member consists of a movable element, such as a diaphragm, which forms a part of the wall structure of the shield and is movable relatively to said wall structure, said element or diaphragm being actuated by the pressures outside the sieve drum and in the interior thereof, and being connected through the pressure transmitting device with the remainder of the shield.

Figure 1:
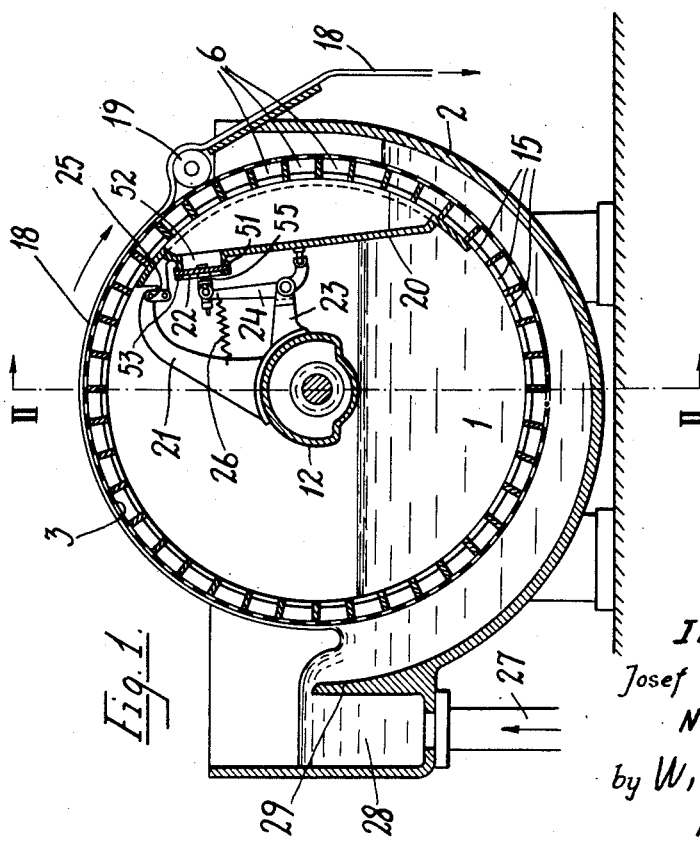

The accompanying drawings illustrate by way of example two constructional forms of filters according to the present invention. Fig. 1 shows a rotary suction cell filter in cross section on the line I—I in Fig. 2, which shows a vertical axial section of the filter on the line II—II in Fig. 1. Fig. 3 shows a cross section on the line III—III in Fig. 4, and Fig. 4 shows a vertical axial section on the line IV—IV in Fig. 3, of a filter without cells, in which the sieve shell is directly exposed to the interior of the sieve drum over the entire width of the shell. The same reference numerals are used in the various figures to designate similar parts.

Referring to Figs. 1 and 2, 1 denotes the rotary sieve drum, and 2 denotes the tank which contains the fiber pulp in which the sieve drum is partially immersed. The fiber pulp flows through the pipe 27 into the box 28 which is separated from the tank by the overflow wall 29 over which the pulp flows into the tank 2. In the constructional form shown in Figs. 1 and 2, the sieve drum is provided inside the sieve shell 3 along the inner circumference thereof with a plurality of cells 6 extending between the heads 4 and 5 of the drum. The bottoms of said cells form a cylindrical wall 30 inside the shell 3 between the heads 4 and 5. In the constructional form illustrated in Figs. 1 and 2, said wall 30 is made integral with a radial disk or web 7 in the interior of the drum. The drum is supported by journals or pivots 10 and 11 secured to the head 4 and to the web 7, respectively, said pivots being journalled in bearings 8 and 9, respectively. The bearing 8 is mounted on the outside of the tank 2, while the bearing 9 for the pivot 11 is supported by a stationary cylindrical member 12 which is concentric to the axis of rotation of the drum and which extends from the wall of the tank into the drum. The inner end of said member 12 is closed by a wall 12a. The pivot 11 is sealed against the said wall 12a of the cylindrical member 12 by means of a stuffing box 13, and the head 5 which rotates about the cylindrical member 12, is sealed against said member by means of a stuffing box 14. Each cell 6 communicates through an opening 15 in its bottom, i. e. in the cylindrical wall 30, with the interior of the sieve drum 1, which also communicates through a passage 17 in the cylindrical member 12 with the suction and drain pipe 16 through which suction, i. e. a reduced or, in this case, subatmospheric pressure is maintained in the interior of the drum, in a manner well known in the art, and through which liquid is drained from the interior of the drum between the radial disk 7 and the head 5.

Removal of the web of material 18 from the sieve drum is effected by means of a discharge roll 19. In order to facilitate the removal of the web, the cells in the vicinity of the point of removal are shielded from the suction within the drum by means of a baffle plate or shield 20 so that practically equal pressures will prevail on opposite sides of the sieve shell 3 at the point of removal of the web. The shield 20 is positioned between the web 7 and the head 5 and covers the bottom openings 15 of the cells in the cylindrical wall 30 from a point at a distance of a few cells above the roll 19 to a point at some distance below the liquid level in the tank 2. The shield 20 is movably supported by means of links 25 from a supporting arm 21 mounted on the cylindrical member 12.

In the constructional form illustrated in Figs. 1 and 2 the pressure actuated member according to the invention is provided in the wall of the shield 20 and consists of a flexible diaphragm 22 the periphery of which is secured between the flanged rim 51 of an aperture 52 in said shield 20, and a ring 53 which is fastened to said rim 51 by any suitable means such as screws or rivets 54. In this way the portion of the diaphragm 22 within said ring 53 is capable of flexing movement in a direction perpendicular to its plane. It will be obvious that the said flexible diaphragm 22 constitutes a portion of the wall or enclosure which surrounds the interior of the drum, in which suction is maintained, and separates it from the outside atmosphere. Therefore, like the shield 20 itself, the flexible diaphragm 22 is subjected on its outer surface to the pressure outside the sieve drum, in this case the atmospheric pressure, and on its inner surface to the reduced or subatmospheric pressure prevailing in the interior of the sieve drum. Consequently, the pressure actuated member, i. e. the flexible diaphragm 22, is actuated by the difference between the pressures acting on the outside and on the inside of the drum. The outside air pressure being greater than the reduced pressure in the interior of the drum, the diaphragm 22 is subjected to a resultant differential pressure which acts upon the diaphragm in the inward direction, and therefore, the diaphragm tends to move inwards. Attached to the center of the flexible diaphragm 22 on the inner side thereof is a pin 55 the inner end of which is pivotally attached to the long arm of a double-armed lever 24 journalled in a support 23 secured to the cylindrical member 12, the short arm of said lever 24 being movably connected to the shield 20. The said double-armed lever 24 thus constitutes a motion or pressure transmitting device which transmits the inward directed force resulting from the said differential pressure acting upon the diaphragm 22, and transforms it into a force acting in the outward direction on the shield 20 which is thus forced against the cylindrical wall 30 of the sieve drum. It will be understood that the short arm of the lever 24 is connected to the shield 20 at or in the vicinity of the center of gravity of that surface of the shield which is actuated by the inside pressure, so that the shield will be caused to bear against the sieve drum with a pressure that is practically evenly distributed along the entire circumference of the shield.

If, for instance, the area of the diaphragm 22 is so chosen that it amounts to $\frac{1}{10}$ of the remaining active area of the shield 20, then the force exerted in the inward direction on said area of the shield by the pressure difference between the outside and inside pressures, becomes ten times greater than the force exerted on the diaphragm by the said pressure difference in the inward direction. Now, if the long arm of the lever 24 is made ten times longer than the short arm of said lever, it will be understood that the shield 20 will be automatically relieved of pressure, that is to say, the pressure difference will not impart to the shield a tendency to move from its position, whatever said position may be. In order to effect the required sealing pressure between the shield 20 and the inner surface of the cylindrical wall 30 of the sieve drum, use may be made in this case of a spring or several springs acting upon the shield, but said springs need not be dimensioned with a view to produce, in addition to the sealing pressure, also a counter-pressure to balance the outside pressure on the shield. A simple way of carrying out this arrangement is to insert a tension spring 26 between the outer end of the long arm of the lever 24 and a stationary member, such as the supporting arm 21.

It is also possible, however, to utilize the force acting inwards on the diaphragm 22 due to the pressure difference for the purpose of producing, wholly or partially, the sealing pressure between the shield 20 and the inner surface of the sieve drum. If in the example above assumed the lengths of the arms of the lever 24 are made in the proportion 12:1, then the short lever arm will exert on the shield 20 an outward directed force which is 1.2 times the inward directed pressure on the shield. The surplus, namely 0.2 of said force will then constitute the sealing pressure. In order to produce, however, under all conditions regardless of the magnitude of the pressure difference between the outside and the inside pressures, a certain sealing pressure, use may also in this case be made of a pressure produced by means of springs or in some other manner well known in the art, for the purpose of effecting a predetermined sealing pressure, and in such case the leverage is of course proportioned in such manner that the diaphragm 22 produces through the lever 24 the additional sealing pressure required.

In the constructional form above described and illustrated in Figs. 1 and 2 the shield 20 is provided with one diaphragm 22 only and associate lever 24. For broad shields a larger number of diaphragms are used. As an example, Figs. 3 and 4 show a constructional form of the invention applied to a so-called shell filter in which the shield is provided with several pressure actuated members in the form of diaphragms.

Referring to Figs. 3 and 4, the rotary seive drum 31 comprises two heads 34 and 35 which are attached to and support a cylindrical sieve shell 33. In this case there are no cells on the inside of said sieve shell 33. Each of the heads 34 and 35 is provided with a tubular journal or pivot 40 and 41, respectively, which pass through stuffing boxes 36 and 37, respectively, in the walls of the tank 32 and are rotatably supported in bearings 38 and 39, respectively, carried by exterior brackets 42 on the walls of the tank. A gear wheel 43 is secured to the end of the tubular journal 41 projecting beyond the bearing 39 and serves to transmit rotational movement to the sieve drum 31 from any suitable driving device, not illustrated in the drawing. A central tubular stationary shaft or tube 44 extends through the tubular journals 40 and 41 and through the interior of the drum. Said tube 44 is closed at its left-hand end as viewed in Fig. 4, and the right-hand end thereof is attached to a box 45 to which a water drain pipe 46 is connected and which is provided with a flanged socket 47 for attachment to a suction pipe, not illustrated in the drawing. The stationary tube 44 is provided with a suitable number of apertures 48 through which suction is applied to the interior of the drum, and through which the water in the interior of the drum flows out through the tube 44 to the drain pipe 46.

The baffle plate or shield 50 extends across substantially the entire width of the sieve shell 33 intermediate the heads 34 and 35, as will be seen from Fig. 4. The shield is movably supported by means of links 25 in a supporting arm 21 which in this constructional form is mounted on the stationary tube 44. The shield 50 is shown as provided with four pressure actuated members in the form of diaphragms 22 provided in openings in the wall of the shield. As in the construction above described in connection with Figs. 1 and 2, each of the diaphragms 22 is connected to the long arm of a lever 24, the short arm of which is movably connected to the shield 50. Each of said levers 24 is journalled in a support 23 which is mounted on the central tube 44. Also in this constructional form a tension spring 26 is inserted between the long arm of each lever 24 and the tube 44 for the same purpose as above stated in connection with Figs. 1 and 2.

It will be readily understood that the construction illustrated in Figs. 3 and 4 functions in the same manner as above described in connection with Figs. 1 and 2.

We claim:

1. A filter of the character described, comprising a tank serving to receive a pulp mixture, a rotary sieve drum adapted to be covered over a portion of its circumference by the pulp mixture in said tank, said sieve drum having a perforated sieve shell, means associated with said sieve drum for maintaining in the interior of said drum a lower pressure than the pressure outside the sieve drum, a stationary shield in the interior of said drum adjustable towards and away from the inner surface of said sieve shell and cooperating with a portion of said inner surface of said sieve shell at a zone at which the web of material is removed from the outer face of said sieve shell so as to shield off said portion of the sieve shell at said zone from the pressure in the interior of said drum, said shield having an aperture in its wall, a pressure actuated member closing said aperture and capable of movement relatively to said shield under the influence of the pressure difference between the pressure outside said sieve drum and the pressure in the interior of said drum, and a pressure transmitting device supported in the interior of said drum and being operatively connected to said pressure actuated member and to said shield in such manner that said device is caused to move under the influence of an inwardly directed force resulting from the differential pressure on said pressure actuated member and thereby to cause a corresponding movement of said shield in the outward direction to force said shield against the inner face of said drum.

2. A filter of the character described, comprising a tank serving to receive a pulp mixture, a rotary sieve drum adapted to be covered over a portion of its circumference by the pulp mixture in said tank, said sieve drum having a perforated sieve shell, means associated with said sieve drum for maintaining in the interior of said drum a lower pressure than the pressure outside the sieve drum, a stationary shield in the interior of said drum adjustable towards and away from the inner surface of said sieve shell and cooperating with a portion of said inner surface of said sieve shell at a zone at which the web of material is removed from the outer face of said sieve shell so as to shield off said portion of the sieve shell at said zone from the pressure in the interior of said drum, said shield having an aperture in its wall, a pressure actuated member closing said aperture and capable of movement relatively to said shield under the influence of the pressure difference between the pressure outside said sieve drum and the pressure in the interior of said drum, and a pressure transmitting device comprising a double-armed lever pivotally supported in the interior of said drum, means pivotally connecting one arm of said lever to said pressure actuated member, and means pivotally connecting the other arm of said lever to said stationary shield, whereby inward movement of said first mentioned arm of said lever under the action of an inward directed force produced by the differential pressure on said pressure actuated member results in outward movement of said last mentioned arm of said lever producing an outward directed force acting upon said shield, said pressure actuated member and said shield having such relative areas and said arms of said lever having such relative lengths that the product of the area of said pressure actuated member and the length of the lever arm connected to said member is greater than the product of the area of said shield and the length of the lever arm connected to said shield.

3. A filter of the character described, comprising a tank serving to receive a pulp mixture, a rotary sieve drum adapted to be covered over a portion of its circumference by the pulp mixture in said tank, said sieve drum having a perforated sieve shell, means associated with said sieve drum for maintaining in the interior of said drum a lower pressure than the pressure outside the sieve drum, a stationary shield in the interior of said drum adjustable towards and away from the inner surface of said sieve shell and cooperating with a portion of said inner surface of said sieve shell at a zone at which the web of material is removed from the outer face of said sieve shell so as to shield off said portion of the sieve shell at said zone from the pressure in the interior of said drum, said shield having an aperture in its wall, a flexible diaphragm attached to said shield so as to seal said aperture therein whereby said diaphragm is actuated by the differential pressure between the pressure outside said sieve drum and the pressure in the interior of said drum and is capable of flexing movement relatively to said shield under the influence of such differential pressure, and a pressure transmitting device supported in the interior of said drum and comprising two movable members connected to one another so as to move in unison, one of said members of said pressure transmitting device being operatively connected to said flexible diaphragm in such manner that it is caused to move under the influence of an inward directed force resulting from the differential pressure on said flexible diaphragm and thereby to cause a corresponding movement of the second member of said pressure transmitting device, said second member of said pressure transmitting device being operatively connected to said shield in such manner that such movement thereof in unison with said first mentioned member imparts to said shield a force acting thereon in the outward direction to force said shield against the inner face of said drum.

4. A filter of the character described, comprising a tank serving to receive a pulp mixture, a rotary sieve drum adapted to be covered over a portion of its circumference by the pulp mixture in said tank, said sieve drum having a perforated sieve shell, means associated with said sieve drum for maintaining in the interior of said drum a lower pressure than the pressure outside the sieve drum, a stationary shield in the interior of said drum adjustable towards and away from the inner surface of said sieve shell and cooperating with a portion of said inner surface of said sieve shell at a zone at which the web of material is removed from the outer face of said sieve shell so as to shield off said portion of the sieve shell at said zone from the pressure in the interior of said drum, said shield having an aperture in its wall, a flexible diaphragm attached to said shield so as to seal said aperture therein whereby said diaphragm is actuated by the differential pressure between the pressure outside said sieve drum and the pressure in the interior of said drum and is capable of flexing movement relatively to said shield under the influence of such differential pressure, a pressure transmitting device comprising a double-armed lever pivotally supported in the interior of said drum, means pivotally connecting one arm of said lever to said flexible diaphragm, and means pivotally connecting the other arm of said lever to said stationary shield, whereby inward movement of said first mentioned arm of said lever under the action of an inward directed force produced by the differential pressure on said flexible diaphragm results in outward movement of said last mentioned arm of said lever producing an outward directed force acting upon said shield.

JOSEF VITALIS VITALIUS.
NILS KLYKKEN.

REFERENCES CITED

The following references are of record in the file of this patent:

UNITED STATES PATENTS

| Number | Name | Date |
|---|---|---|
| 916,481 | Noyes | Mar. 30, 1909 |
| 1,377,765 | Elling | May 10, 1921 |
| 1,848,478 | Haug | Mar. 8, 1932 |
| 2,008,580 | Dennison et al. | July 16, 1935 |
| 2,053,664 | Hiller et al. | Sept. 8, 1936 |